United States Patent
Licata

[11] 3,757,093
[45] Sept. 4, 1973

[54] SELF LEVELING SYSTEM USING PERIODIC PERTURBATIONS

[75] Inventor: William H. Licata, Adelphi, Md.

[73] Assignee: The United States of America as represented by the Secretary of the Navy, Washington, D.C.

[22] Filed: Sept. 22, 1972

[21] Appl. No.: 291,471

[52] U.S. Cl................. 235/150.1, 33/321, 333/326, 73/504, 235/61.5 G, 235/150.25
[51] Int. Cl............................................ G06f 15/20
[58] Field of Search..........................33/321–326; 73/504–505; 235/61.5 G, 150.1 AP, 150.1 A, 150.1, 150.25; 74/5.47

[56] References Cited
UNITED STATES PATENTS

| | | | |
|---|---|---|---|
| 2,577,912 | 12/1951 | Perkins et al. | 74/5.47 |
| 3,109,970 | 11/1963 | Smyth | 235/150.1 X |
| 3,343,991 | 9/1967 | Koenig | 235/150.1 X |

*Primary Examiner*—Felix D. Gruber
*Assistant Examiner*—R. Stephen Dildine, Jr.
*Attorney*—R. S. Sciascia and J. A. Cooke et al.

[57] ABSTRACT

A system for leveling a stable or strapped down missile guidance platform on a moving ship having accelerometers and gyroscopes. Periodic signals perturbate the system allowing leveling of the platform which is superimposed on a control function to cancel ship motion.

6 Claims, 1 Drawing Figure

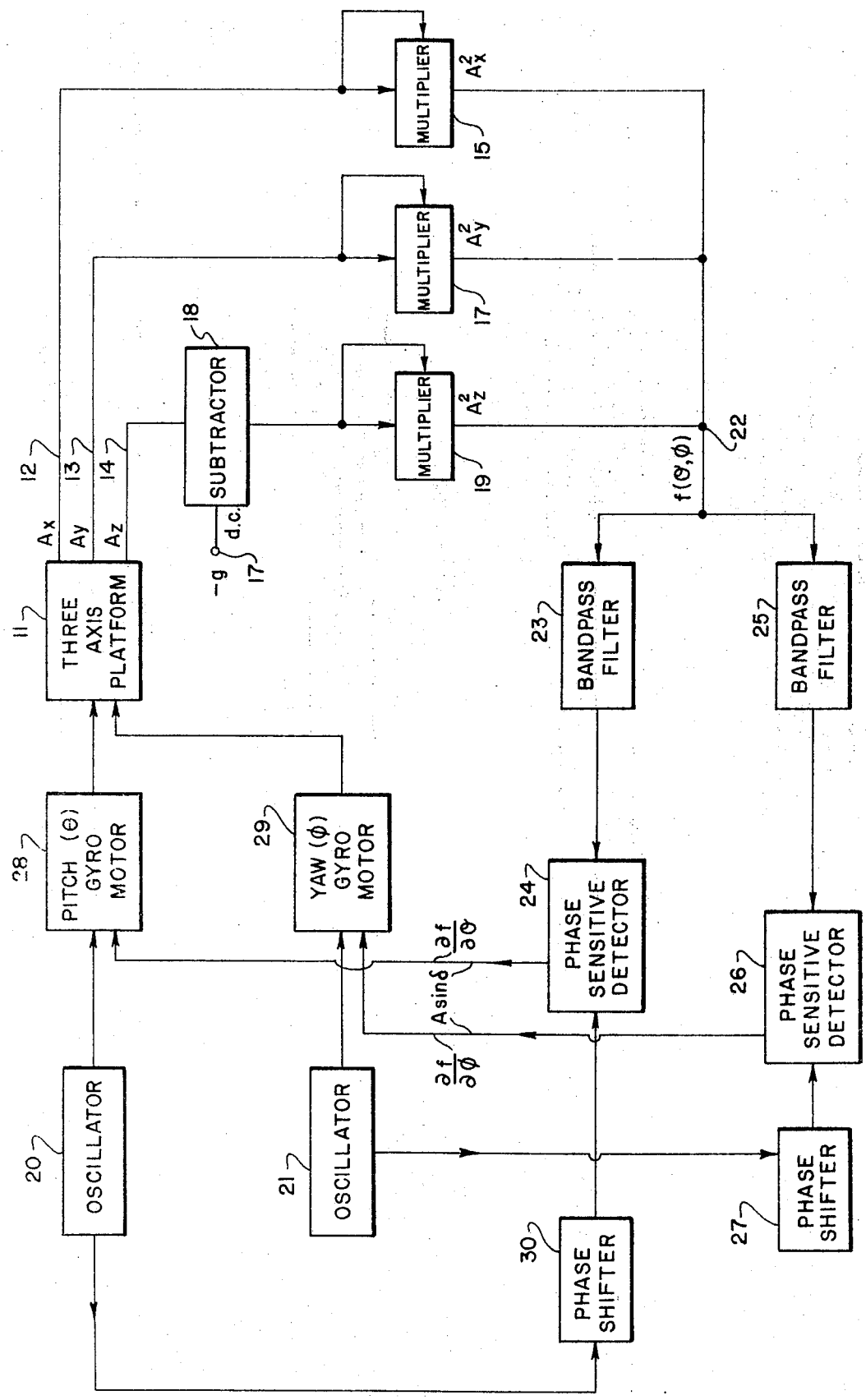

SELF LEVELING SYSTEM USING PERIODIC PERTURBATIONS

BACKGROUND OF THE INVENTION

The present invention relates to a self leveling system for stable or strapped-down platforms.

A major problem in missile guidance is self-leveling, i.e., leveling a platform without the aid of an external reference. Only the sensors on the missile platform can be used for alignment. Alignment generally means setting the stable platform perpendicular to the gravity vector or determining the initial values of some type of transformation matrix. In many cases, the problem is complicated by the lack of a stable base to align to, due to ship motion. This problem also occurs when leveling using an external reference.

Both platforms in use today, stable or strapped down, contain three linear accelerometers and three rate integrating gyroscopes on a stable element supported on a gimbal. The accelerometers provide the location of the missile with respect to some fixed reference frame in inertial space. The gyroscopes are used to keep the input axis of the accelerometers pointed in the right direction or update a transformation matrix which has the same effect of stabilizing the position of a gimbal. To move the gimbal, the torquing motor of the rate integrating gyro is excited, and the gimbal moves at a rate equal and opposite to the torquing rate.

The fixed reference frame used is based on gravity. The platform is leveled when the vertical accelerometer reads gravity and the remaining two accelerometers read zero. Usually, the platform is also aligned in azimuth so one of the horizontal accelerometers points in a fixed direction. The level position of the platform is primarily controlled by the pitch ($\theta$) and yaw ($\phi$) gimbals. (The Euler angles, $\theta$, $\phi$, and $\psi$ denote the position of the gimbals.) Normally, the output of the X accelerometer is used to drive the pitch gimbal until the accelerometer output is zero. The y accelerometer drives the yaw gimbal until the y accelerometer has a zero output.

A stable platform is aligned by moving the platform gimbals until the horizontal accelerometers read zero. This requires interrupting normal platform operation, and if the missile is resting on a moving base, the accelerometer feedback cannot cancel ship motion exactly. It is the normal job of the gyros to cancel any angular input motion. The gyros sense rotational motion of the platform exactly but the accelerometers sense it as a complicated function of gimbal angles. The accelerometers are trying to do two jobs, cancel motion of the ship and provide leveling signals. The first is done poorly and the second is hindered by the inaccuracies of the first. This means that filters with long time constants are added to the leveling system resulting in a very slow leveling response, limiting the reaction time available. Additionally, the aforementioned operation commences only after the stable element has been positioned close to level, requiring coarse leveling first. Furthermore, the relationship between the Euler angles and the outputs of the accelerometer is highly non-linear and there is cross coupling between the leveling loops.

SUMMARY OF THE INVENTION

The present invention utilizes periodic perturbations to minimize a function $f(\theta,\phi) = A_x^2 + A_y^2 + (A_z-g)^2$ to level the platform. Compensating signals derived from comparing signals operating on the gyro torquing motors and those from the function $f(\theta\phi)$ are supplied to the gyro torquing motor to minimize $f(\theta,\phi)$.

It is therefore an object of the present invention to provide an accurate self-leveling platform having a fast leveling time.

Another object of the present invention is to provide a self-leveling platform having decoupled and linear loops.

Yet another object of the present invention is to provide a missile platform capable of aligning itself perpendicular to the gravity without the aid of an external reference.

A still further object of the present invention is to provide a self-leveling system for stable or strapped down platforms using periodic perturbations.

These and other objects will become more apparent from the following description taken in connection with accompanying drawing, in which:

The FIGURE is a schematic representation of the periodic perturbation self-leveling system.

DESCRIPTION OF THE PREFERRED EMBODIMENT

The outputs of the three platform accelerometers are related to the Euler angles through the following equation:

$$\begin{bmatrix} A_x \\ A_y \\ A_z \end{bmatrix} = \begin{bmatrix} \cos\theta\cos\psi & -\cos\phi\sin\psi+\sin\theta\sin\phi\cos\psi & \sin\phi\sin\psi+\sin\theta\cos\phi\cos\psi \\ \cos\theta\sin\psi & \cos\phi\cos\psi+\sin\theta\sin\phi\sin\psi & -\sin\phi\cos\psi+\sin\theta\cos\phi\sin\psi \\ -\sin\theta & \sin\phi\cos\theta & \cos\theta\cos\phi \end{bmatrix}^{-1} \begin{bmatrix} 0 \\ 0 \\ g \end{bmatrix} \quad (1)$$

The periodic perturbation system is used to minimize some function of one or more variables. To level a platform, the function $$f(\theta,\phi) = A_x^2 + A_y^2 + (A_z-g)^2 \quad (2)$$

where $A_x$, $A_y$, and $A_z$ are given by the matrix equation (1), is varied by changing the values of $\theta$ (pitch) and $\phi$ (yaw) until the function is at a minimum. The function may be expanded into a Taylor series expansion as follows:

$$f(\theta_o + \Delta\theta, \phi_o + \Delta\phi) = f(\theta_o, \phi_o) + \sigma f(\theta_o, \phi_o)/\sigma\theta \Delta\theta + \sigma f(\theta_o, \phi_o)/\sigma\phi \Delta\phi + \text{higher order terms} \quad (3)$$

where $\theta_o$ and $\phi_o$ are the initial value of $\theta$ and $\phi$ respectively.

If $\Delta\theta$ and $\Delta\phi$ are small, the higher order terms of equation (3) are neglible and may be ignored. If $\sigma f/\sigma\theta$ and $\sigma f/\sigma\phi$ are known, $\Delta\theta$ and $\Delta\phi$ can be chosen such that $$f(\theta_o + \Delta\theta, \phi_o + \Delta\phi) < f(\theta_o, \phi_o). \quad (4)$$

$\sigma f/\sigma\theta$ and $\sigma f/\sigma\phi$ may be approximated as follows:

$$\sigma f/\sigma\theta \quad , \quad = f(\phi_o + \delta\theta, \phi_o) - f(\theta_o, \phi_o)/\delta\phi \quad (5)$$

and $$\sigma f/\sigma\phi = f(\theta_o, \phi_o + \delta\phi) - f(\theta_o, \phi_o)/\delta\phi \quad (6)$$

where $\delta\theta$ and $\delta\phi$ are very small perturbations in $\theta$ and $\phi$, respectively, and $\delta 0 < \Delta 0$ and $\delta\phi < \Delta\phi$.

$f(\theta,\phi)$ approaches a minimum using the following method:

1. $(\sigma f/\sigma\theta)$ and $\sigma f/\sigma\phi$ are approximated by perturbating the platform gimbals using oscillators at specific frequencies,
2. Value of $\Delta\theta$ and $\Delta\phi$ are picked, and
3. $\theta_o$ and $\phi_o$ are increased by $\Delta\theta$ and $\Delta\phi$ giving a new $\theta_o$ and $\phi_o$.

Referring now to the leveling system shown in the Figure, a sine wave oscillator 20, at a low frequency $f_1$ of 1 Hz though any other frequency may be used, operates the pitch ($\theta$) gyro torque motor 28 and a second sine wave oscillator 21, at a frequency $f_2$ of approximately 5 Hz, through any other frequency different from the first oscillator 20 frequency $f_1$ is permissible, operates on the yaw ($\phi$) gyro torque motor 29. The motor outputs are supplied to the gimbals of three axis platform 11 producing the three accelerometer outputs $A_x$, $A_y$ and $A_z$ on leads 12, 13, and 14, respectively. The x accelerometer output $A_x$ is squared in multiplier 15, the y accelerometer output $A_y$ is squared in multiplier 16 and accelerometer output $A_z$, after having been reduced by $-g$ volts d.c. from terminal 17 in subtractor 18, is squared in multiplier 19. The three multiplier outputs are combined at terminal 22 to produce to function.

$$f(\theta, \phi) = A_x^2 + A_y^2 + (A_z - g)^2 \quad (2)$$

which includes frequency $f_1$, $f_2$ corresponding to those from oscillator 20 and 21 and higher order frequencies.

An active bandpass filter 23 only passes signals having frequencies $f_1$, corresponding to those from oscillator 20, to pass into one input terminal of phase sensitive detector 24. The other input to detector 24 is the oscillator 20 frequency $f_1$, having been shifted in phase shifter 30 to compensate for the delay incurred in bandpass filter 23. Similarly, active bandpass filter 25 only passes signals having frequencies $f_2$ corresponding to those from oscillator 21 as one input of phase sensitive detector 26, whose other input is the oscillator 21 frequency $f_2$ delayed in phase shifter 27. Detectors 24 and 26, both comprising a multiplier and a low pass filter, supply d.c. outputs of A sin $\delta$, $\delta$ being the delay incurred in processing the signal through platform 11 and multiplers 15, 17 and 19, detector 24 output being $\sigma f/\sigma\theta$ and detector 26 output being $\sigma f/\sigma\phi$. These outputs are supplied to pitch gyro torque motor 28 and pitch gyro torque motor 29 respectively where they will be added as corrective signals to the oscillator signals. The platform will therefore move until $\sigma f/\sigma\theta = o$ and $\sigma f/\sigma\phi = 0$ which is the condition of $f(\theta,\phi)$ to be a minimum and the platform level.

It is therefore clear that reductions in leveling time is obtained by the rapid and accurate leveling system of the present invention. The pitch and yaw loops, operating on different frequencies, are decoupled and linear.

Many modifications may be made to the above described specific embodiment of the invention without departing from the spirit and scope of the invention, which is defined in the appended claims.

What is claimed is:

1. A self-leveling system for a platform having accelerometers comprising:
    a first oscillator operating at a frequency $f_1$;
    a second oscillator operating at a frequency $f_2$;
    a first gyroscope motor coupled to said first oscillator;
    a second gyroscope motor coupled to said second oscillator;
    said first and second motors operating on said platform to produce a function to be minimized;
    a first filter for bandpassing signals containing said frequency $f_1$ from said function;
    first means coupled to said first filter for comparing said first oscillator signal with said $f_1$ bandpassed signals;
    said first means supplying an input signal to said first gyroscope motor;
    a second filter for bandpassing signals containing said frequency $f_2$ from said function;
    second means coupled to said second filter for comparing said second oscillator signal with said $f_2$ bandpassed signals;
    said second means supplying an input signal to said second gyroscope motor.

2. A self-leveling system as recited in claim 1 wherein said function comprises $A_x^2 + A_y^2 + (A_z - g)^2$, where $A_x$, $A_y$ and $A_z$ are the outputs of said platform accelerometers and g is a voltage representative of gravity.

3. A self-leveling system as recited in claim 2 wherein:
    said first gyroscope operates on the Euler pitch angle and said second gyroscope operates on the Euler yaw angles; and
    wherein said function includes terms containing said pitch and yaw angles.

4. A self-leveling system as recited in claim 3 wherein said first and second means comprise a phase sensitive detector including a multiplier and low pass filter.

5. A self-leveling system as recited in claim 4 further including
    a phase shifter coupled between said first oscillator and said first means; and
    a phase shifter coupled between said second oscillator and said second means.

6. A self-leveling system as recited in claim 5 wherein the outputs of said phase sensitive detectors are d.c. voltages and said frequency $f_1$ is 1 Hz and said frequency $f_2$ is 5 Hz.

* * * * *